United States Patent [19]
Cleary

[11] Patent Number: 4,795,799
[45] Date of Patent: Jan. 3, 1989

[54] PRODUCTION OF AROMATIC SULFIDE/KETONE POLYMERS WITH ALKALI METAL CARBONATE

[75] Inventor: James W. Cleary, Augusta, Ga.

[73] Assignee: Phillips Petroleum Company, Bartlesville, Okla.

[21] Appl. No.: 94,189

[22] Filed: Sep. 8, 1987

[51] Int. Cl.$^4$ .............................................. C08G 65/38
[52] U.S. Cl. .................................... 528/222; 528/125; 528/126; 528/226; 528/388
[58] Field of Search ............... 528/226, 222, 388, 125, 528/126

[56] References Cited

U.S. PATENT DOCUMENTS

| 3,919,177 | 11/1975 | Campbell | 260/79.1 |
| 4,038,259 | 7/1977 | Campbell et al. | 260/79.1 |
| 4,064,114 | 12/1977 | Edmonds, Jr. | 260/79.1 |
| 4,393,197 | 7/1983 | Edmonds, Jr. | 528/388 |
| 4,525,579 | 6/1985 | Idel et al. | 528/388 |
| 4,590,104 | 5/1986 | Zeiner et al. | 427/389.9 |
| 4,716,212 | 12/1987 | Gaughan | 528/226 |

FOREIGN PATENT DOCUMENTS 0100536 2/1984 European Pat. Off. .
0210377 2/1987 European Pat. Off. .

Primary Examiner—Harold D. Anderson
Attorney, Agent, or Firm—J. D. Brown

[57] ABSTRACT

A process is provided for the production of aromatic sulfide/ketone polymers which comprises contacting under suitable polymerization conditions: (1) at least one dihaloaromatic ketone, (2) at least one organic amide, (3) at least one alkali metal hydrosulfide, (4) water, and (5) at least one member selected from the group consisting of (a) alkali metal carbonates and (b) mixtures of alkali metal carbonate with alkali metal hydroxide.

10 Claims, No Drawings

PRODUCTION OF AROMATIC SULFIDE/KETONE POLYMERS WITH ALKALI METAL CARBONATE

This invention relates to the production of aromatic sulfide/ketone polymers. In another aspect this invention relates to the production of aromatic sulfide/ketone polymers of high molecular weight. In a further aspect, this invention relates to the production of aromatic sulfide/ketone polymers of high molecular weight in a readily controlled manner.

BACKGROUND OF THE INVENTION

Thermoplastic synthetic polymers are well known for the desirable characteristics of moldability and processing with techniques which are especially suited for the mass production of various articles from such polymers. However, many thermoplastic polymers by their very nature are often not useable in applications requiring relatively high use temperatures. In recent years various thermoplastic polymers have been developed which can be employed at relatively high temperatures and under corrosive conditions. Such thermoplastic polymers generally have a relatively high melting or softening point that provides the enhanced high temperature resistance of articles prepared therefrom.

A continuing problem remains however in that the molecular weight of such heat resistant thermoplastic polymers is often not high enough to maintain a good balance of physical properties in the final article produced from the polymer. Therefore, methods of producing such thermoplastic heat resistant polymers to an adequate degree of polymerization are still being sought.

Aromatic sulfide/ketone polymers are known in the art as having high crystalline melting points and are thus desired in applications requiring a high use temperature. Such applications include, for example, coatings for electrical wiring, automotive parts, aircraft parts, and the like. The thermoplastic aromatic sulfide/ketone polymers are also especially useful in applications wherein they are reinforced with heat resistant fibers, filaments or fillers to provide heat resistant composite structures. Such composite materials comprising the aromatic sulfide/ketone polymers show toughness as well as good heat distortion resistance and resistance to a variety of solvents.

It is an object of my inventiont o provide a process for producing aromatic sulfide/ketone polymers. It is a further object of my invention to provide a process for producing aromatic sulfide/ketone polymers of high molecular weight. It is a still further object of my invention to provide a simple and readily controllable process for producing aromatic sulfide/ketone polymers of high molecular weight.

BRIEF STATEMENT OF THE INVENTION

According to my invention a process is provided for the production of an aromatic sulfide/ketone polymer which comprises contacting compounds comprising:
(1) at least one dihaloaromatic ketone,
(2) at least one organic amide,
(3) at least one alkali metal hydrosulfide,
(4) water, and
(5) at least one member selected from the group consisting of (a) alkali metal carbonates and (b) mixtures of alkali metal carbonate with alkali metal hydroxide, under polymerization conditions of temperature and time sufficient to form said polymer.

My invention thus provides a simple straightforward method for producing aromatic sulfide/ketone polymer of high molecular weight.

DETAILED DESCRIPTION OF THE INVENTION

Dihaloaromatic ketones that can be employed in the process of my invention can be represented by the formula:

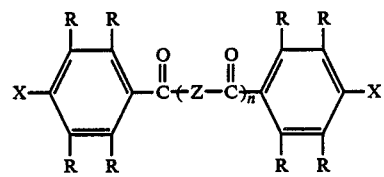

where each X is selected from the group consisting of fluorine, chlorine, bromine, and iodine; Z is a divalent radical selected from the group consisting of

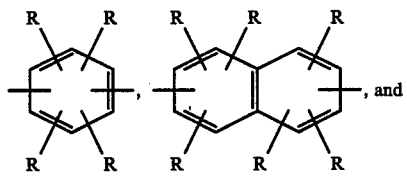

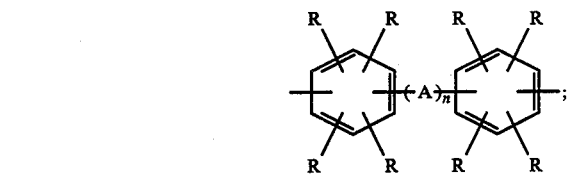

n is 0 or 1; A is selected from the group consisting of oxygen sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, each n is 0.

My process more preferably employs a dihalobenzophenone of the formula:

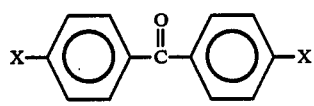

wherein X is defined as above.

Examples of suitable dihaloaromatic ketones which can be employed in the process of my invention include 4,4'-dichlorobenzophenone, 4,4'-difluorobenzophenone, 4,4'-dibromobenzophenone, 4,4,'-diiodobenzophenone, 4-chloro-4'-fluorobenzophenone, 1,4-bis-(4-fluorobenzoyl)-benzene,
1,4-bis-(4-chlorobenzoyl)-benzene,
1-(4-chlorobenzoyl)-4-(4-fluorobenzoyl)-benzene,
bis[4-(4-chlorobenzoyl)phenyl]thioether,
bis(2,3,5,6-tetramethyl-4-chlorophenyl) ketone,
bis[4-(4-chlolrobenzoyl)phenyl] ether, 4,4'-bis-(4-chlorobenzoyl)-biphenyl, and the like, and mixtures of any two or more thereof. The presently preferred dihaloaromatic ketone is 4,4'-dichlorobenzophenone because of its effectiveness and commercial availability.

In my invention the amount of dihaloaromatic ketone employed depends upon the amount of alkali metal hydrosulfide employed but generally these compounds will both be present in about equal molar proportions. The preferred molar ratio of dihaloaromatic ketone to the alkali metal hydrosulfide is within the range of about 0.95:1 to about 1.05:1.

The organic amides used in the method of my invention should be substantially liquid at the reaction temperature and pressure employed. The amides can be cyclic or acyclic and can have 1 to about 12 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-2pyrrolidone, N-ethyl-2-pyrrolidone, N-cyclohexyl-2-pyrrolidone, ε-caprolactam, N-methyl-ε-caprolactam, N,N'-ethylenedi-2-pyrrolidone; hexamethylphosphoramide, tetramethylurea, and the like, and mixtures thereof.

The amount of organic amide employed according to my invention can be expressed in terms of a molar ratio based on the alkali metal hydrosulfide employed. Broadly, the molar ratio of organic amide to alkali metal hydrosulfide will be from about 4:1 to about 16:1, and preferably from about 8:1 to about 12:1. N-methyl-2-pyrrolidone is especially preferred because of excellent results and ready availability.

Alkali metal hydrosulfides that can be employed according to my invention include sodium hydrosulfide, lithium hydrosulfide, potassium hydrosulfide, rubidium hydrosulfide, cesium hydrosulfide, and mixtures thereof. Sodium hydrosulfide is preferred because of ready availability and good results obtained therewith. The alkali metal hydrosulfide can conveniently be utilized in my invention as an aqueous solution. For example, an aqueous solution of NaSH having about 60 weight percent NaSH is convenient to use.

Alkali metal carbonates that can be employed according to my invention include lithium carbonate, sodium carbonate, potassium carbonate, rubidium carbonate, cesium carbonate, and mixtures thereof. Sodium carbonate is preferred because of ready availability and generally good results obtained therewith.

Alkali metal hydroxides that can be employed according to my invention in admixture with at least one alkali metal carbonate include lithium hydroxide, sodium hydroxide, potassium hydroxide, rubidium hydroxide, cesium hydroxide, and mixtures thereof. Sodium hydroxide is preferred because of ready availability and good results obtained using this compound.

According to one aspect of my invention, if a mixture of at least one alkali metal carbonate and at least one alkali metal hydroxide is employed, instead of at least one alkali metal carbonate alone, said mixture should contain at least about 5 mole percent alkali metal carbonate. Preferably, said mixture will have about 20 to about 90 mole percent alkali metal carbonate, and more preferably about 40 to about 80 mole percent alkali metal carbonate. In any case, it is especially preferred that when the mixture of at least one alkali metal carbonate and at least one alkali metal hydroxide is employed according to my invention, that the molar ratio of alkali metal hydroxide to alkali metal hydrosulfide be less than about 1:1, and the molar ratio of alkali metal carbonate to alkali metal hydrosulfide be at least about 0.5:1.

The amount of water employed according to the process of my invention can be conveniently expressed in terms of a molar ratio based on the alkali metal hydrosulfide. Broadly, the molar ratio of water to alkali metal hydrosulfide will be about 3:1 to about 7:1, and preferably about 4:1 to about 6:1.

The charge sequence of the various compounds employed in the process of my invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at said temperature. It is also possible to preheat a mixture of only certain of the compounds in a separate vessel than to charge this mixture to a preheated mixture of the remainder of the compounds in the reaction vessel.

Although the reaction temperature at which the polymerization process of my invention can be conducted can vary over a wide range, it will generally be within the range of about 125° C. to about 450° C., preferably about 175° C. to about 350° C., more preferably about 225° C. to about 275° C. The reaction time can also vary widely depending in part on the reaction temperature employed but generally will be within the range of about 10 minutes to about 72 hours, preferably about 1 hour to about 20 hours. The pressure employed should be sufficient to maintain the polymerization reaction mixture substantially in the liquid phase. The pressure will generally be in the range of about 0 psig to about 400 psig, preferably about 150 psig to about 250 psig.

The aromatic sulfide/ketone polymers produced by the process of my invention generally can be recovered from the polymerization reaction mixture in particulate form employing any convenient method. For example, the reaction mixture can be diluted with water or a mixture of water with organic amide and the resulting particualte aromatic sulfide/ketone polymer separated from this mixture by filtration. The recovered polymer is generally washed with water at least once and preferably several times with at least a portion of the washing being conducted at elevated temperature. A preferred recovery procedure includes a washing step in which the polymer is treated in the presence of an aqueous solution of a calcium salt, e.g. calcium acetate, prior to a final washing with water.

The aromatic sulfide/ketone polymers produced according to my invention having a high molecular weight can be employed to make molded articles, fibers, film and the like as well as being employed in the production of fiber reinforced composites all of which exhibit heat distortion resistance characteristic of this high melting partially crystalling thermoplastic polymer.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of my invention, and not limitative of the reasonable and suitable scope thereof.

A 2-gallon Magnadrive stirred stainless steel reactor manufactured by Autoclave Engineers, Inc. was used for the polymerization runs. The polymerization components (aqueous sodium hydrosulfide, sodium hydroxide and/or sodium carbonate, 4,4'-dichlorobenzophenone, water, and N-methyl-2-pyrrolidone) were placed in the reactor and air removed by pressuring with nitrogen and venting. The system was heated under autogenous pressure and was held at 250° C. for 3 hours, and then was heated to 300° C. Thereafter, about 600 mL water was pressured into the reactor with faster stirring and the system cooled to give granular polymer. The granular polymer was collected on a filter and washed until the filtrate was clear. A portion was dried with an acetone rinse, sucked dry on a suction filter, and dried in an air oven at 120° C.

Inherent viscosity (I.V) was determined on samples of dried polymer in concentrated sulfuric acid at 30° C. at a polymer concentration 0.5 g per deciliter (dL) utilizing a #200 Cannon-Fenske Routine viscometer.

EXAMPLE I

Polymerization runs were conducted in the manner described above in which a mixture of sodium carbonate and sodium hydroxide was employed in the preparation of poly(p-phenylene sulfide/ketone) (PPSK) according to my invention. Control runs were also made which employed sodium hydroxide alone in the polymerization reaction mixture. The recipe employed in these runs is presented below:

| Recipe | |
|---|---|
| | Compound, g-mole |
| 4,4'-dichlorobenzophenone (DCBP) | 2.005 |
| Sodium hydrosulfide | 2 |
| N—methyl-2-pyrrolidone (NMP) | 24 |
| Water (deionized) | 6 |
| Sodium hydroxide | Variable |
| Sodium carbonate | Variable |

The results obtained in these runs are shown in Table I below.

TABLE I

| Run No. | NaOH g-mole | $Na_2CO_3$ g-mole | $Na_2CO_3$ mole %[a] | I.V., dL/g |
|---|---|---|---|---|
| 1 | 2 | 0 | 0 | 0.664 |
| 2 | 1 | 1 | 50 | 0.811 |
| 3[b] | 2 | 0 | 0 | 0.546 |
| 4[b] | 2 | 1 | 33 | 0.342 |
| 5[b] | 1 | 1 | 50 | 0.918 |

[a]Mole % based on NaOH + $Na_2CO_3$.
[b]Runs made with different lot of DCBP than used in Runs 1 and 2 and with different source of NMP (Pilot Plant recycle) than used in Runs 1 and 2.

Results shown in Table I demonstrate that mixtures of NaOH and $Na_2CO_3$ can provide PPSK polymers of much higher inherent viscosity than NaOH alone, except when the molar ratio of NaOH to NaSH was 1:1 (Run 4).

EXAMPLE II

Other runs were conducted in the manner employed for the runs of Example I but which employed $Na_2CO_3$ alone rather than a mixture of $Na_2CO_3$ and NaOH. Another control run (Run 6) employed NaOH alone as in Runs 1 and 3 of Table I. The results of those runs are presented in Table II below.

TABLE II

| Run No. | NaOH g-mole | $Na_2CO_3$ g-mole | I.V. dL/g |
|---|---|---|---|
| 6[a] | 2 | 0 | 0.546 |
| 7 | 0 | 2 | 0.835 |
| 8[a] | 0 | 2 | 0.855 |
| 9[a] | 0 | 1.5 | 1.020 |
| 10[a] | 0 | 1.1 | 1.238 |

[a]Runs made with Pilot Plant recycle NMP.

The results shown in Table II demonstrate that the use of $Na_2CO_3$, in the absence of NaOH, can provide PPSK polymers of exceptionally high inherent viscosity compared to that obtained with NaOH alone (Run 6).

That which is claimed is:

1. A process for the production of an aromatic sulfide/ketone polymer which comprises contacting compounds comprising:
   (1) at least one dihaloaromatic ketone,
   (2) at least one organic amide,
   (3) at least one alkali metal hydrosulfide,
   (4) water, and
   (5) at least one member selected from the group consisting of (a) alkali metal carbonates and (b) mixtures of at least one alkali metal carbonate with at least one alkali metal hydroxide,
   under polymerization conditions of temperature and time sufficient to form said polymer.

2. A process according to claim 1 wherein said (5) is said mixture of alkali metal carbonate and alkali metal hydroxide wherein said mixture has a mole percent of alkali metal carbonate of about 20 to about 90.

3. A process according to claim 2 wherein the molar ratio of alkali metal hydroxide to alkali metal hydrosulfide is less than about 1:1 and the molar ratio of alkali metal carbonate to alkali metal hydrosulfide is at least about 0.5:1.

4. A process according to claim 1 wherein said (5) is said at least one alkali metal carbonate and wherein the molar ratio of alkali metal carbonate to alkali metal hydrosulfide is about 0.5:1 to about 1.1:1.

5. A process according to claim 3 wherein the molar ratio of said dihaloaromatic ketone to said alkali metal hydrosulfide is about 0.95:1 to about 1.05:1.

6. A process according to claim 5 wherein the molar ratio said organic amide to said alkali metal hydrosulfide is about 4:1 to about 16:1.

7. A process according to claim 6 wherein the molar ratio of said water to said alkali metal hydrosulfide is about 3:1 to about 7:1.

8. A process according to claim 4 wherein the molar ratio of said dihaloaromatic ketone to said alkali metal hydrosulfide is about 0.95:1 to about 1.05:1.

9. A process according to claim 8 wherein the molar ratio of said organic amide to said alkali metal hydrosulfide is about 4:1 to about 16:1.

10. A process according to claim 9 wherein the molar ratio of said water to said alkali metal hydrosulfide is about 3:1 to about 7:1.

* * * * *